C. L. GARDNER.
WELL PIPE CLAMP.
APPLICATION FILED APR. 27, 1912.
1,058,577.
Patented Apr. 8, 1913.
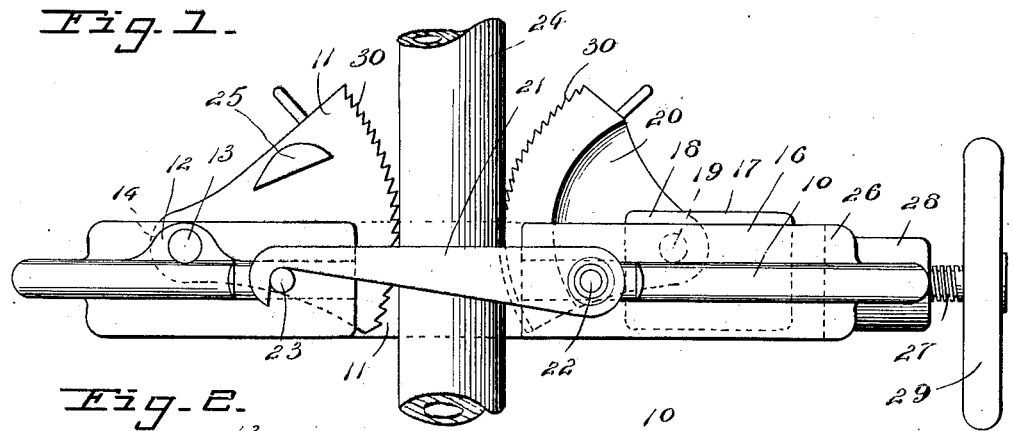
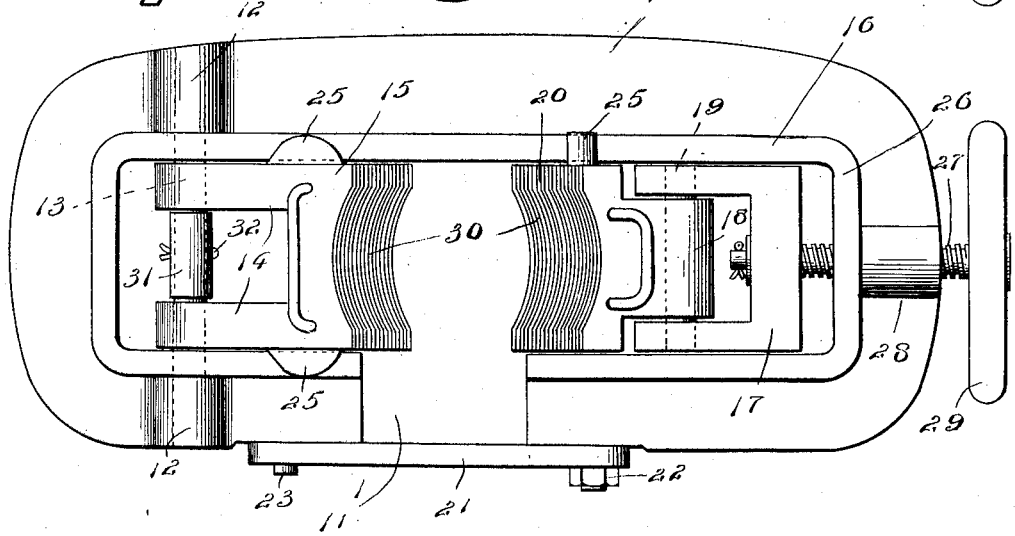
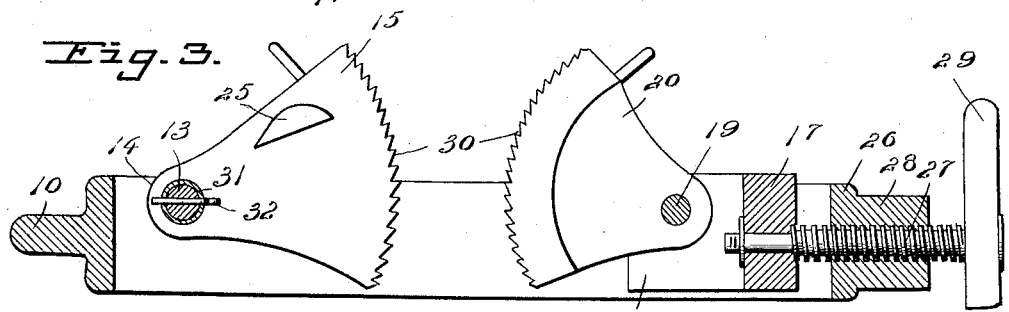
Inventor
Charles L. Gardner
Witnesses
By Victor J. Evans
Attorney

UNITED STATES PATENT OFFICE.

CHARLES L. GARDNER, OF STERLING, COLORADO.

WELL-PIPE CLAMP.

1,058,577.  Specification of Letters Patent.  Patented Apr. 8, 1913.

Application filed April 27, 1912. Serial No. 693,547.

*To all whom it may concern:*

Be it known that I, CHARLES L. GARDNER, a citizen of the United States, residing at Sterling, in the county of Logan and State of Colorado, have invented new and useful Improvements in Well-Pipe Clamps, of which the following is a specification.

The invention relates to clamps, and more particularly to the class of well pipe clutches or clamps.

The primary object of the invention is the provision of a device of this character in which loose dogs will automatically operate after being adjusted to the required size of a well pipe so as to receive and grip the same, whereby the said pipe may be suspended in or withdrawn from a well shaft, the dog being readily and easily adjusted to accommodate varying sizes of pipes.

Another object of the invention is the provision of a device of this character in which the pipe may be readily and easily elevated while disposed within the said device, yet the pipe will be prevented from reverse movement thereby locking the same in adjusted position for the suspension of the pipe within the well.

A further object of the invention is the provision of a device of this character which is simple in construction, reliable and efficient in operation and inexpensive in manufacture.

With these and other objects in view, the invention consists in the construction, combination and arrangement of parts as will be hereinafter more fully described, illustrated in the accompanying drawing, and pointed out in the claim hereunto appended.

In the drawing:—Figure 1 is a side elevation of a device constructed in accordance with the invention showing the pipe held therein. Fig. 2 is a top plan view with the pipe removed. Fig. 3 is a vertical longitudinal sectional view through the same.

Similar reference characters indicate corresponding parts throughout the several views in the drawing.

Referring to the drawings by numerals, the clamp or clutch device comprises an elongated yoke or frame 10, provided with a gap or opening 11 in one side thereof, and is formed with alining bearings 12 near one end in which is fitted a transverse pintle 13 having journaled thereon the legs 14 of a substantially sector-shaped swinging jaw 15, while provided in the inner edges of the sides of the yoke at the opposite end thereof are guide ways 16 having engaged therein a U-shaped slide 17 the ends 18 of which have mounted therein a pintle 19 on which is journaled a sector-shaped swinging jaw 20 adapted to coöperate with the jaw 15 for a purpose presently described.

Adapted to bridge the opening or gap 11 in one side of the yoke or frame 10 is a hook-like latch 21 swingingly connected to a pivot 22 and is adapted to detachably engage a keeper pin 23 stationarily mounted in the yoke or frame 10, and this latch 21 is adapted to close the said gap or opening 11 and to give rigidity to the yoke or frame when subjected to heavy stress while in active use. On the opening of the latch 21 a piece of work such as a pipe 24, can be introduced between the jaws 15 and 20 to be gripped thereby.

Formed on opposite sides of the jaw 15 and on one side of the jaw 20 are stop lugs 25 which limit the movements of the said jaws in one direction by contacting with a raised flange 26 formed on the yoke or frame 10 about the open center thereof, and in this manner the jaws 15 and 20 will be prevented from passing too far through the yoke or frame when in use.

Securely swiveled in the closed end of the slide 17 is the inner end of an adjusting screw 27, the same being threaded in a boss 28 formed on one end of the yoke or frame 10, the outer end of the screw 27 being provided with a turning wheel 29, thus on the rotation of the latter, the said slide 17 may be moved longitudinally in the guideways 16 for bringing the jaws together for separating the same the desired distance apart as may be required.

The jaws 15 and 20 are formed with outwardly arched tooth biting surfaces 30 whereby the jaws may firmly grip the pipe 24 or other piece of work when passed through the frame or yoke 10 of the device.

Surrounding the pintle 13 between the legs 14 of the jaw 15 is a sleeve 31, the same being held fast upon the pintle by means of a cotter pin 32 passed through the latter and the said sleeve, the said sleeve being designed to prevent displacement of the legs 14 on the jaw when subjected to heavy strain in the handling of massive work.

As heretofore stated the jaws 15 and 20 are made with slightly eccentric gripping faces 30 with reference to their respective axes, the longer radii being on the upper parts of the jaws and the shorter radii on the lower parts, and on adjusting the slide 17 so that the distance between the axes of the jaws is slightly greater than the diameter of the pipe 24 which they are intended to hold the said pipe can be readily inserted in the yoke or frame 10 by raising the jaws and on releasing the same they will bite into the pipe for firmly gripping the same. The said pipe may be pulled upwardly and the jaws 15 and 20 will release their hold thereon during the upward movement of the pipe but upon the freeing of the latter said jaws will firmly grip the pipe for the suspension thereof by the device.

From the foregoing description, taken in connection with the accompanying drawing, it is thought that the construction and operation of the invention will be clearly understood, and therefore, a more extended explanation has been omitted.

What is claimed is:—

In a clamping device comprising a frame, bearings formed in said frame, a pintle journaled in said bearings, a pair of opposed jaws, means for adjusting one of said jaws toward or away from the other jaw, the last mentioned jaw having bifurcated arms and mounted on said pintle, a sleeve mounted on said pintle between said arms, and a pin extending through said sleeve and pintle to prevent lateral movement of and to retain said pintle journaled in said bearings.

In testimony whereof I affix my signature in presence of two witnesses.

CHARLES L. GARDNER.

Witnesses:
C. W. KINZIE,
D. A. BARTHOLOW.

---

Copies of this patent may be obtained for five cents each, by addressing the "Commissioner of Patents, Washington, D. C."